United States Patent [19]
Alexander

[11] Patent Number: 6,033,174
[45] Date of Patent: Mar. 7, 2000

[54] VEHICLE RESTRAINT SENSING SYSTEM

[75] Inventor: James C. Alexander, London, Canada

[73] Assignee: United Dominion Ind., Inc., Charlotte, N.C.

[21] Appl. No.: 08/921,019

[22] Filed: Aug. 29, 1997

[51] Int. Cl.[7] ............................ B65G 67/02; B65G 69/00
[52] U.S. Cl. ............................................................ 414/401
[58] Field of Search .................................. 414/396, 401, 414/584; 14/71.1

[56] References Cited

U.S. PATENT DOCUMENTS

| | | | |
|---|---|---|---|
| 4,127,856 | 11/1978 | Bickel | 340/687 |
| 4,267,748 | 5/1981 | Grunewald et al. | 74/529 |
| 4,282,621 | 8/1981 | Anthony et al. | 14/71.1 |
| 4,488,325 | 12/1984 | Bennett et al. | 14/71.3 |
| 4,553,895 | 11/1985 | Ellis | 414/401 |
| 4,692,755 | 9/1987 | Hahn | 340/687 |
| 4,695,216 | 9/1987 | Erlandsson | 414/401 |
| 4,759,678 | 7/1988 | Hageman | 414/401 |
| 4,830,563 | 5/1989 | Yeakle | 414/401 |
| 4,843,373 | 6/1989 | Trickle et al. | 340/540 |
| 4,915,568 | 4/1990 | West | 414/401 |
| 4,938,647 | 7/1990 | Erlandsson | 414/401 |
| 4,946,330 | 8/1990 | Pederson et al. | 414/401 |
| 5,297,921 | 3/1994 | Springer et al. | 414/401 |

OTHER PUBLICATIONS

Rite Hite Owner's Manual for Model ADL–400, 1994, Pub. No. 1088.
Rite Hite Owner's Manual for Service–Repair Parts for DOK–LOK™, Apr., 1980, Publ. No. 033.
Serco Owner's Manual for Automatic Vehicle Restraint Model: VR 450.
Kelley Truk Stop Owner's Manual, 1982.

*Primary Examiner*—David A. Bucci
*Attorney, Agent, or Firm*—Sughrue, Mion, Zinn, Macpeak & Seas, PLLC

[57] ABSTRACT

A vehicle restraint having a fixed member such as a frame mounted to a dock face and a hook movable relative to the fixed member for engaging a portion of a vehicle and restraining movement of the vehicle away from the dock. A non-contact sensor is employed to determine engagement of the hook with a portion of the vehicle. The sensor is positioned to provide an effective magnetic field in the zone of contact so that engagement with an ICC bar on the vehicle can be ascertained.

20 Claims, 9 Drawing Sheets

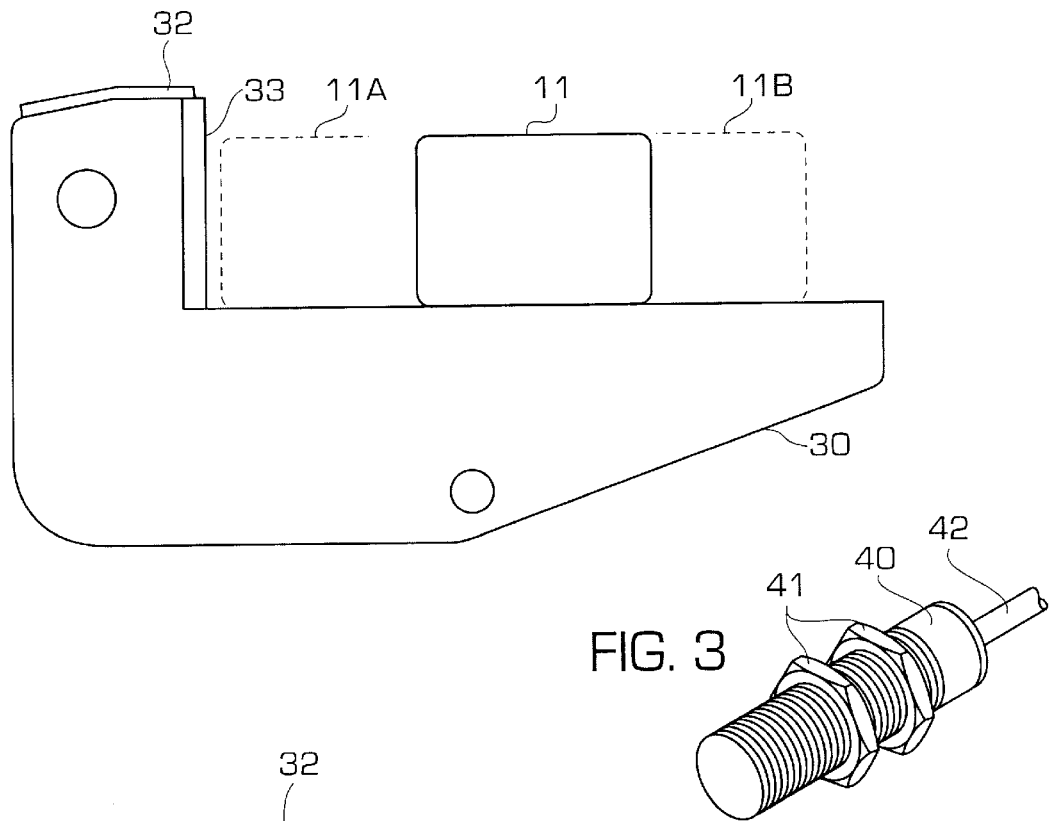
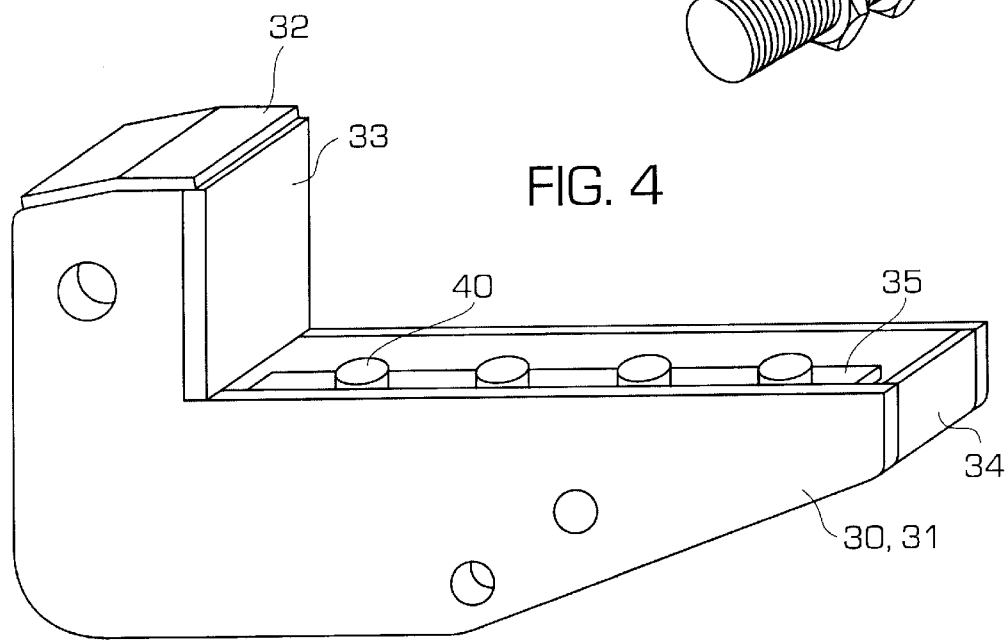

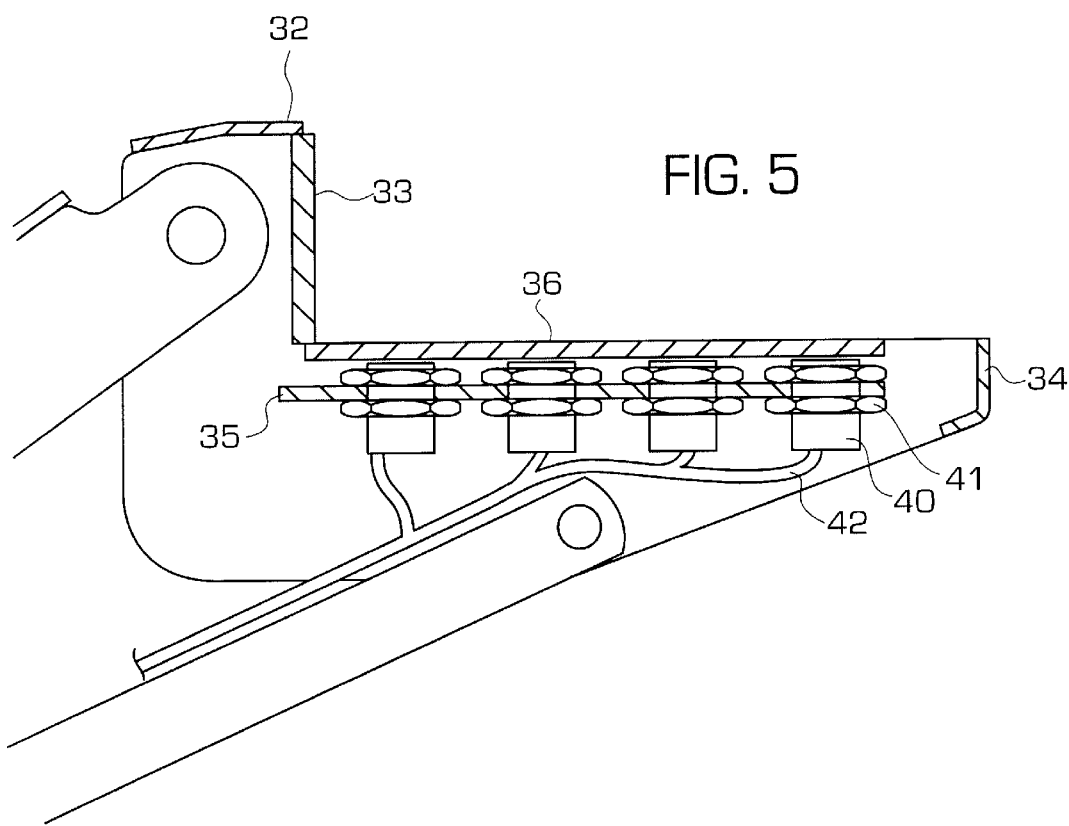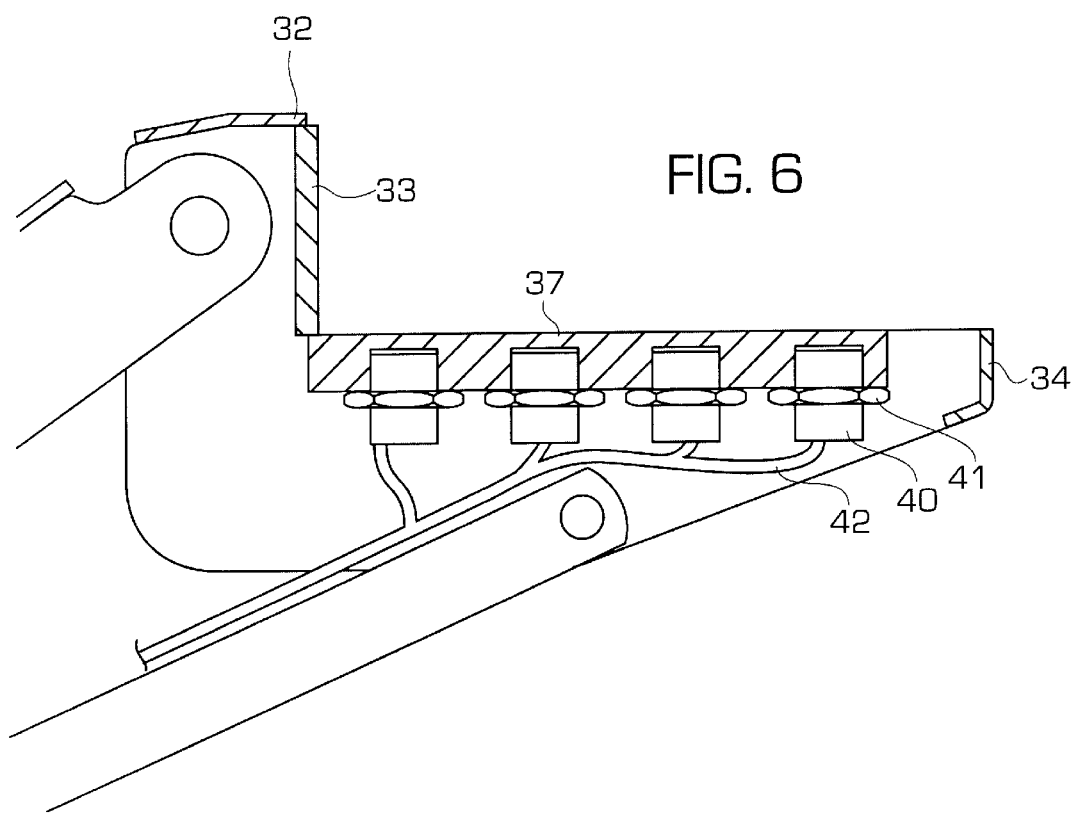

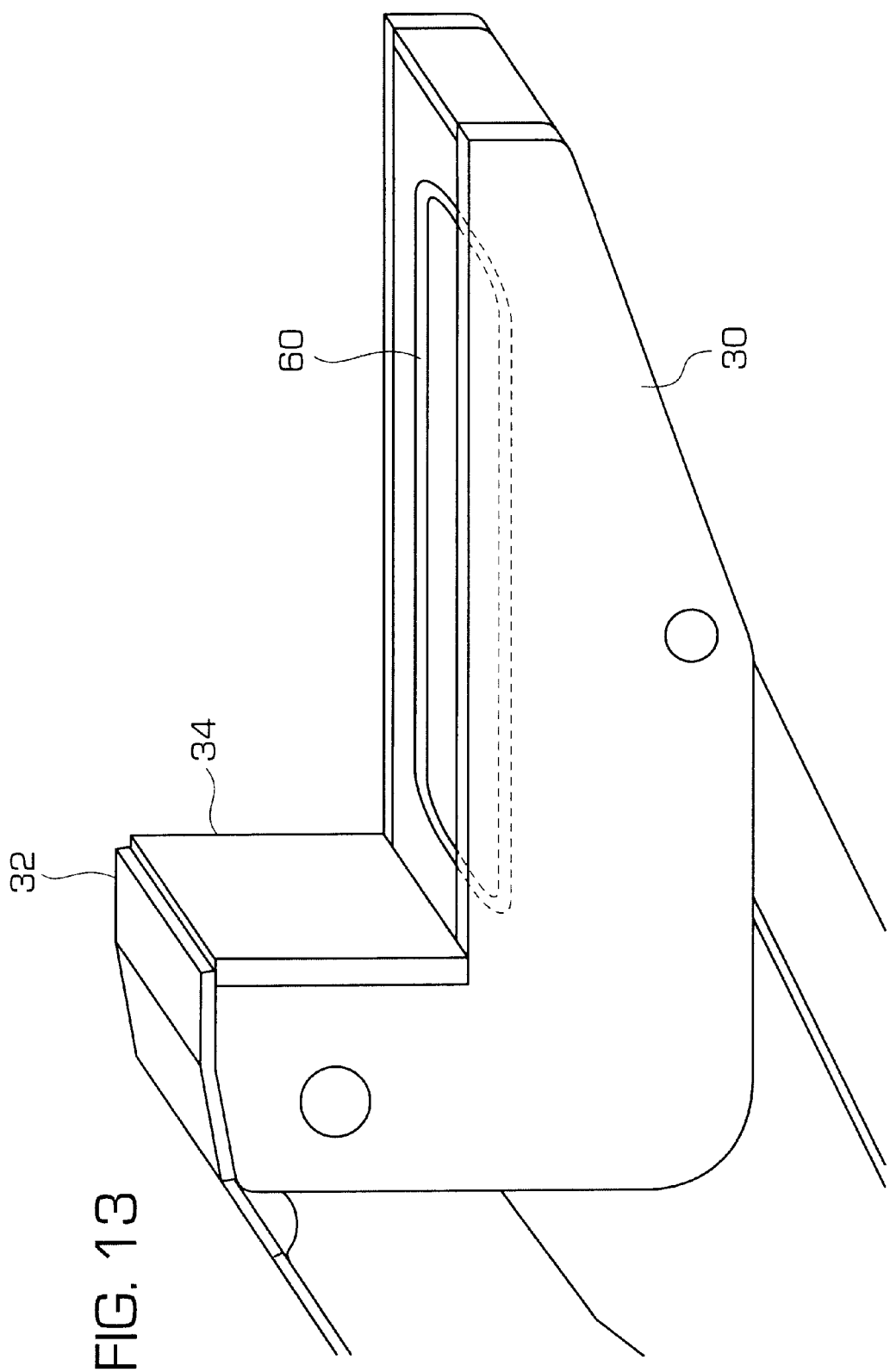

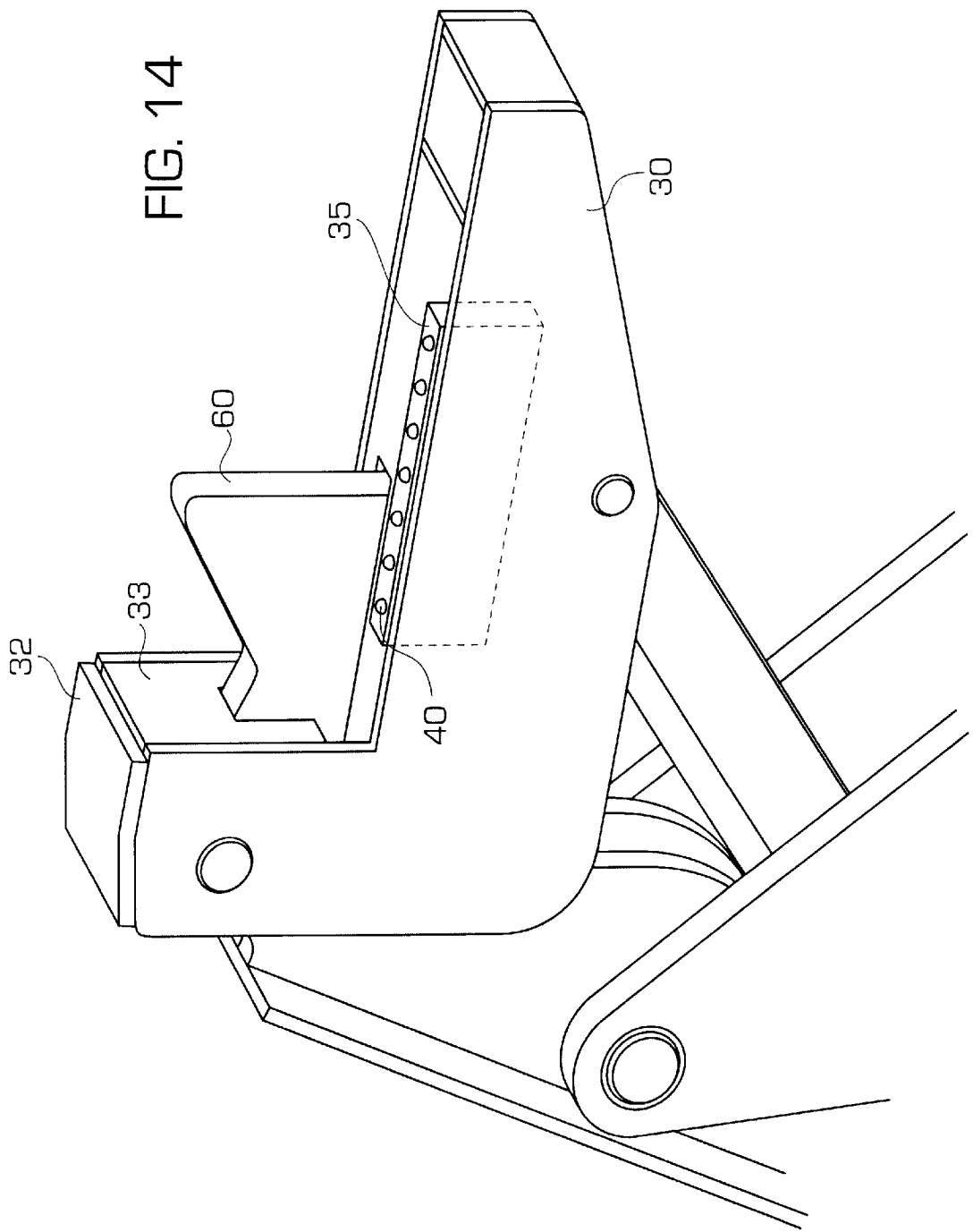

VEHICLE RESTRAINT SENSING SYSTEM

I. BACKGROUND OF THE INVENTION

1. Field of the Invention

This invention relates to an improved system for sensing engagement of a vehicle restraint with a transport truck or trailer which is to be restrained.

2. Prior Art

U.S. Pat. No. 4,127,856 Bickel describes the use of electrical switches to sense the engagement of the vehicle restraint with a bar mounted on the rear of a vehicle. The use of signals indicating engagement of the locking device is now well known in the art. For example, the Rite-Hite "Dok-Lok", Serco "VR" and Kelley "Truk Stop" and "Star" all have models that sense contact with a vehicle ICC bar and generate signals for use by personnel at the loading dock. These techniques are mentioned or described in many U.S. Pat. Nos. including, 4,267,748; 4,282,621; 4,488,325; 4,553,895; 4,692,755; 4,695,216; 4,759,678; 4,830,563; 4,843,373; 4,938,647; and 4,946,330.

One characteristic of all the previous devices is that the electrical switches generate a signal by the presence or absence of physical contact with a moving part. Thus in each device a switch senses a change in the position of a component of the restraining device. The switch does not directly sense the presence or absence of the bar mounted on the rear of a vehicle. While such systems generally function well, and provide useful information to the control system, there are two major deficiencies in all of the previous systems. First, the loading dock area and the rear end of trailers can be very harsh environment as a result of rain, snow, ice, road salt and other materials present at a loading dock. The devices described above use mechanical limit switches which have moving parts which can become corroded or made inoperative by ice, dirt or other debris. Even if the limit switch is an inductive proximity switch, all of the switches described are activated by the motion of a mechanical component of the restraining device, and are therefore subject to malfunction or false signal if one of the moving components should become broken or stick from corrosion or other foreign matter.

In addition, the switch may be generate a false signal if the moving component is activated by foreign material, such as a broom handle or wood from a broken pallet, rather than the bar mounted on the rear of a vehicle.

II. SUMMARY OF THE INVENTION

This invention uses an array of inductive proximity switches to directly sense the presence of a metal bar without the use of any moving sensor components. Thus the sensing device is free from the effects of corrosion, and cannot be activated by non-metallic debris. Another advantage of using proximity switches is that the bar can sense within a limited distance of the hook surface and does not require actual contact. This characteristic is useful in preventing loss of signal caused by momentary loss of contact as the truck bounces relative to the hook during the loading operation.

Inductive proximity switches per se are well known, but heretofore not used in this application in the absence of a moving part to serve as the sensor to determine engagement. The main advantage of their use is the lack of moving parts and ability to operate in harsh environments. Typically they have a cylindrical sensing envelope which is dependent on the diameter of the sensing face. Common sizes are available with diameters from 8 to 30 millimeter and with sensing ranges up to 20 mm (⅝ inches). The sensor may be mounted in a rectangular housing, but the sensing envelope usually remains cylindrical. There are other configurations of proximity switches specifically designed for applications such as bottling lines, but they are highly specialized and are usually much more expensive. A typical commercial proximity switch consists of a threaded cylindrical housing, as shown in FIG. 3, which may be constructed of stainless steel, brass or plastic. Several electrical components are encapsulated within the cylinder and usually an oscillator circuit to create a magnetic field, a voltage regulator to provide a constant voltage to the oscillator circuit, and a transistor to switch current. The introduction of a mass of conductive material into the magnetic field will alter the field and damp the oscillator, causing a detectable decrease in the current through the oscillator circuit. The resultant change in voltage will cause the transistor to change state. The proximity switch will thus prevent or allow current to flow depending on whether the proximity switch is designed to be normally-open or normally-closed.

Additionally, the sensor may have the configuration of a single inductive loop spanning the target zone on the hook or multiple sensing coils. Circuitry may be employed to provide compensation for variations in sensitivity caused by extreme temperatures. The sensor may be used with a variety of hooks, both single and dual.

This invention will be described in greater detail by reference to the attached drawing and the description of the preferred embodiments that follow.

III. BRIEF DESCRIPTION OF THE DRAWING

FIG. 2 is a side view illustration of a vehicle restraint hook showing various positions of engagement with the bar on the rear of a transport vehicle;

FIG. 3 is a perspective view of a typical inductive proximity switch;

FIG. 4 is a perspective view of a vehicle restraint hook with a number of proximity switches mounted between the side plates of the hook;

FIG. 5 is a sectional view of the hook assembly showing the mounting of the proximity switches and protective cover;

FIG. 6 is a sectional view of the hook assembly showing the mounting and protective cover combined;

FIG. 13 is a perspective view of second preferred embodiment of a sensor using an inductive loop; and FIG. 14 is a perspective view of a third preferred embodiment of a sensor used in conjunction with a hook having primary and secondary hooks.

IV. DESCRIPTION OF THE PREFERRED EMBODIMENTS

Figure 1:
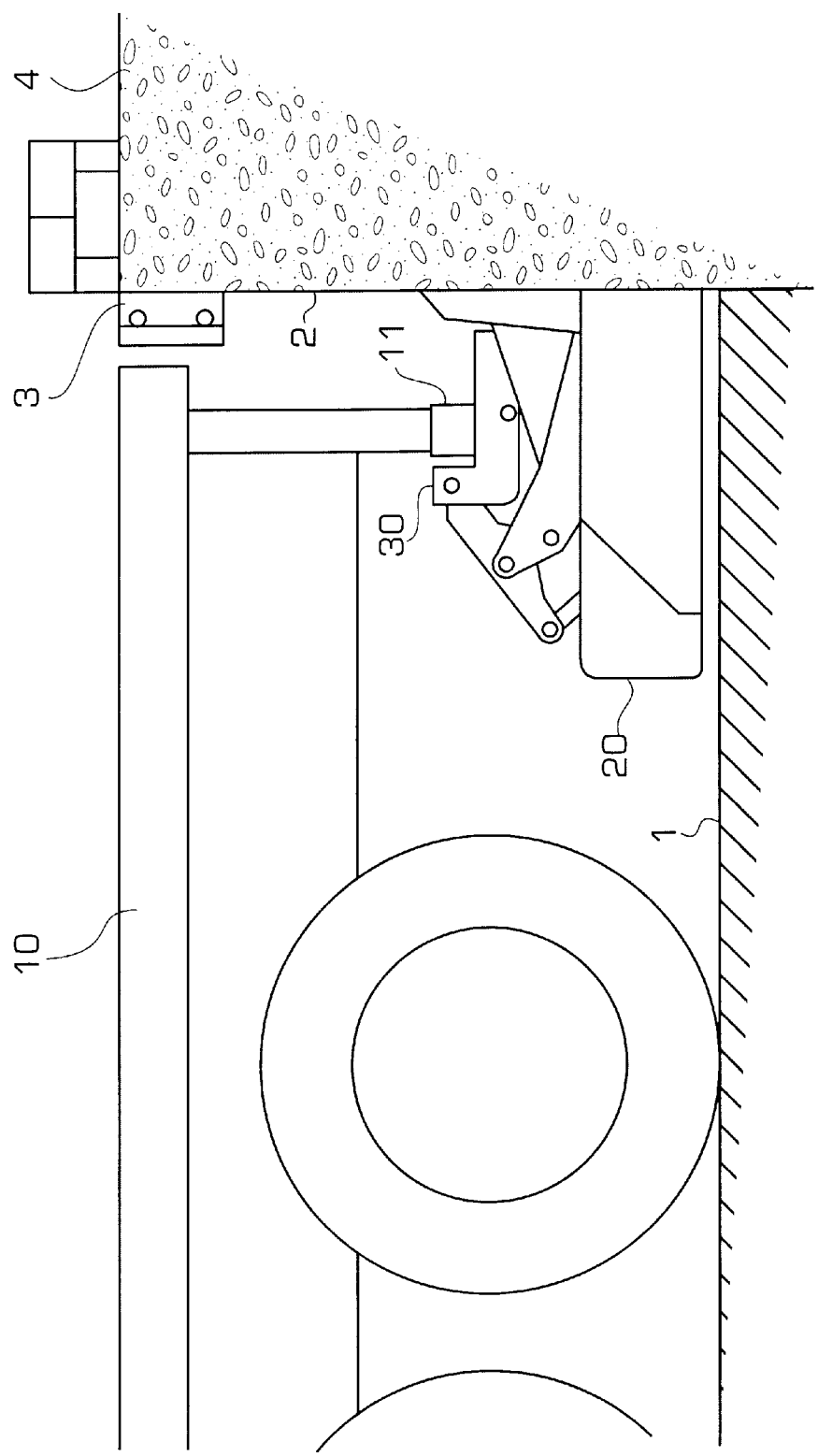
FIG. 1 illustrates a vehicle restraint with hook engaging bar on rear of transport vehicle.

Referring now to FIG. 1, a transport vehicle 10 parked adjacent to a building with the driveway 1, dock wall 2, bumper 3 and building floor 4 is illustrated. A vehicle restraint has a frame or housing 20 and is mounted to the wall (or alternatively to the driveway 1) and has a hook assembly 30 engaging the bar 11, also known as the ICC bar, attached to the rear of the vehicle. As shown in FIG. 2, when the vehicle restraint hook 30 engages the bar 11, the contact point may be anywhere along the horizontal portion as shown by alternate positions 11A and 11B. Each of these positions, and indeed anywhere on the horizontal surface of the hook is a position where the ICC bar 11 may contact the hook and needs to be sensed.

FIG. 3 shows a typical cylindrical proximity switch comprising a threaded cylindrical housing 40, nuts 41 to secure the housing in a suitable mounting hole, and an electrical cable 42. A single proximity switch has a small sensing area so that the presence of the bar would be detected only if it fell within a predetermined distance of the proximity switch. A single switch could not sense all of the bar positions shown in FIG. 2.

FIG. 4 illustrates the hook with an array of proximity sensors 40 placed between the side plates 31 and the end tip 34 of the hook assembly so that the bar 11 cannot contact the horizontal surface of the hook without being within the sensing range of at least one of the switches. The sensors are placed below the contact surface of the hook on a plate 35 and are not subjected to impact from the bar. The hook is completed by cover plates 32 and 33.

FIG. 5 shows the proximity switches 40 mounted through holes in the plate 35 and secured by the nuts 41. The electrical cables 42 are routed through the vehicle restraint mechanism to terminal connections not shown. Although proximity sensors are usually of rugged construction, ideally they should be protected from physical impact and abrasion. Protection can be achieved by providing a cover plate 36 of a tough but non-conductive material such as a strong plastic. Additionally, other components of the hook may be made of a plastic material to provide greater sensitivity for the proximity switches to the ferrous ICC bar.

FIG. 6 shows an alternate configuration which combines the protective cover 37 with the mounting plate. The proximity switches are threaded into the bottom surface of the plate and secured by the nuts 41. Alternatively, the proximity switches may be potted as an integral component comprising an array of switches and an elastomer or plastic insert which is mated to the inside cavity of the hook and secured in place.

Figure 7:
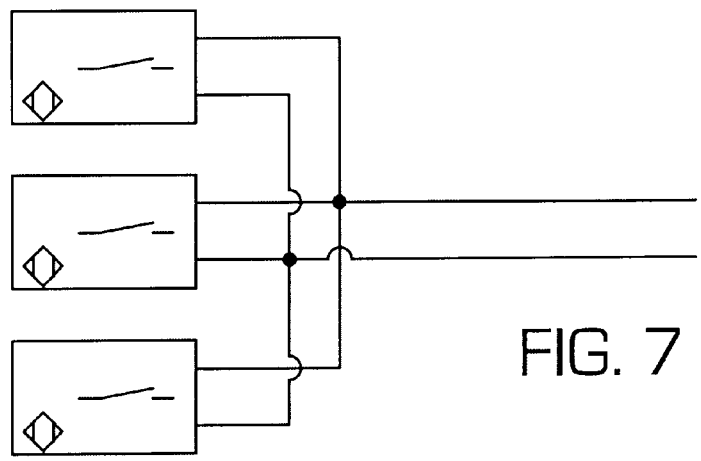
FIGS. 7, 8, 9, 10 are electrical circuits illustrating various interconnection configurations.
Figure 8:
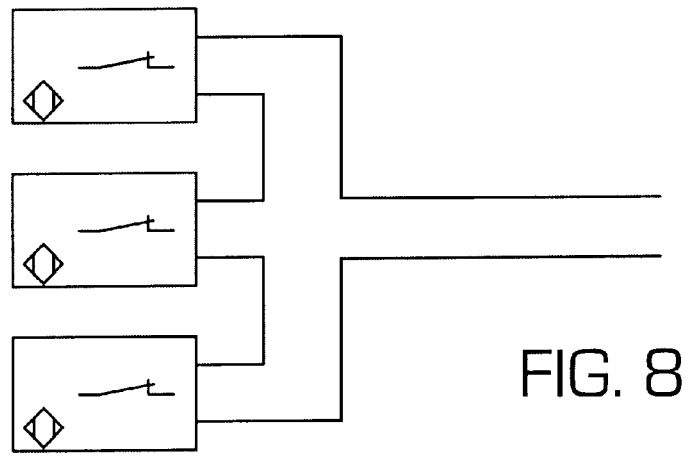

The use of a number of normally-open switches connected in parallel, shown schematically in FIG. 7, or normally-closed switches connected in series, shown schematically in FIG. 8, would allow a signal to be transferred by two conductors to the control system. Either circuit may be used and it is apparent that the number of proximity sensors is thus only a function of hook configuration and the sensitivity to be achieved.

Another preferred embodiment uses a type of proximity sensor known as an analogue sensor. This device is simpler than a proximity switch because it has an oscillator circuit but no voltage regulator or transistor and relies on an external controller for voltage regulation and signal detection. The current conducted by the device decreases in proportion to the degree of damping of the oscillator circuit caused by the proximity of a conductive mass. These characteristics are well suited for use with a programmable logic controller or PLC, for the input circuitry of a PLC typically has a controlled voltage and the ability to detect changes in current. Several analogue sensors connected in series, shown schematically in FIG. 9, would conduct current which would be relatively higher when in a free state than when the proximity of a mass of conductive material damped the oscillator of one of the sensors.

Figure 9:
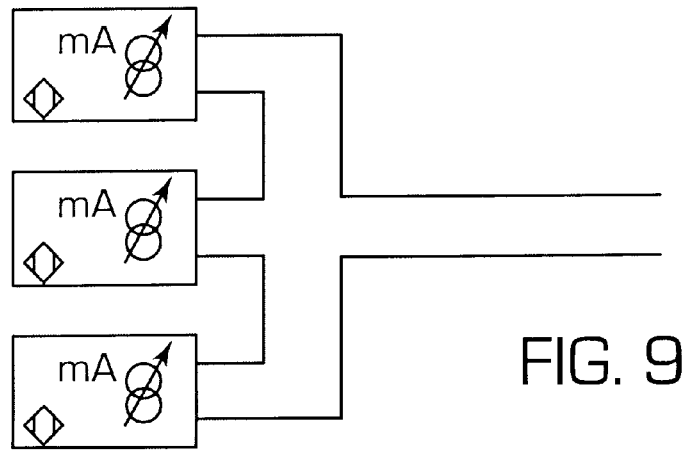
Figure 10:
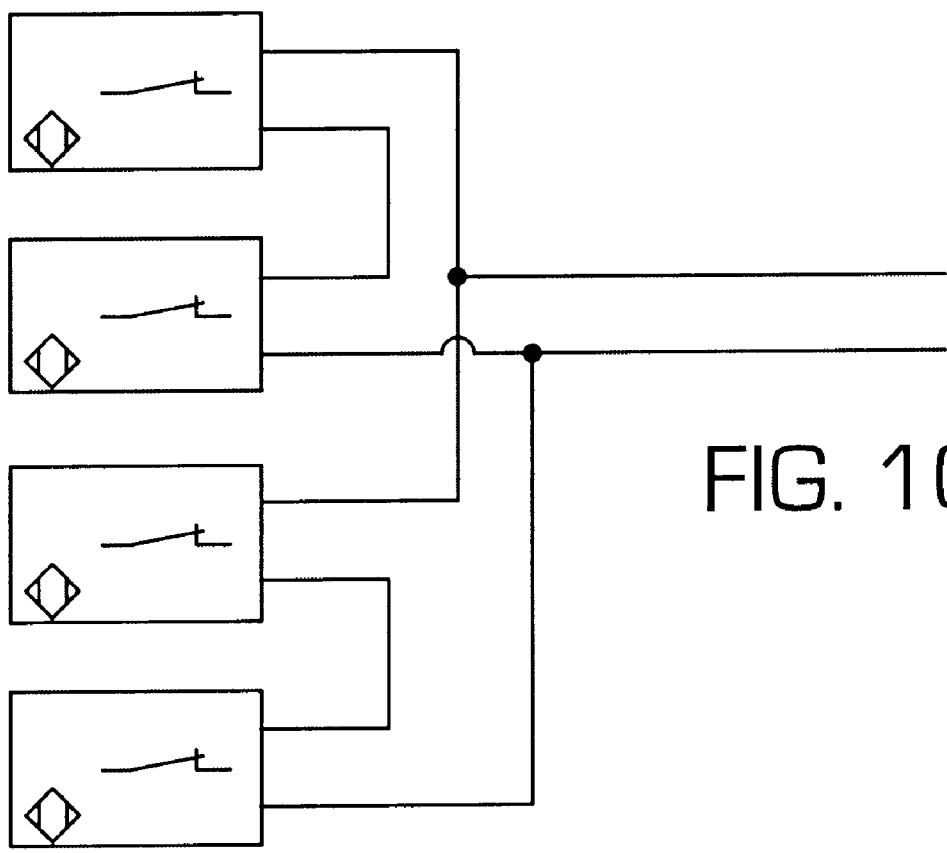

Although FIGS. 7, 8, & 9 show three sensors in parallel or series, the actual number of sensors would be determined by the size of the hooking envelope and the range of the sensors. The selection of the actual sensor and the wiring configuration would be determined by the voltage of the power source and the voltage requirement of the sensor. For example, if the power source is 24 volts and the sensor requires 12 volts, four sensors could be used by connecting them in series and parallel as shown in FIG. 10.

Figure 11:
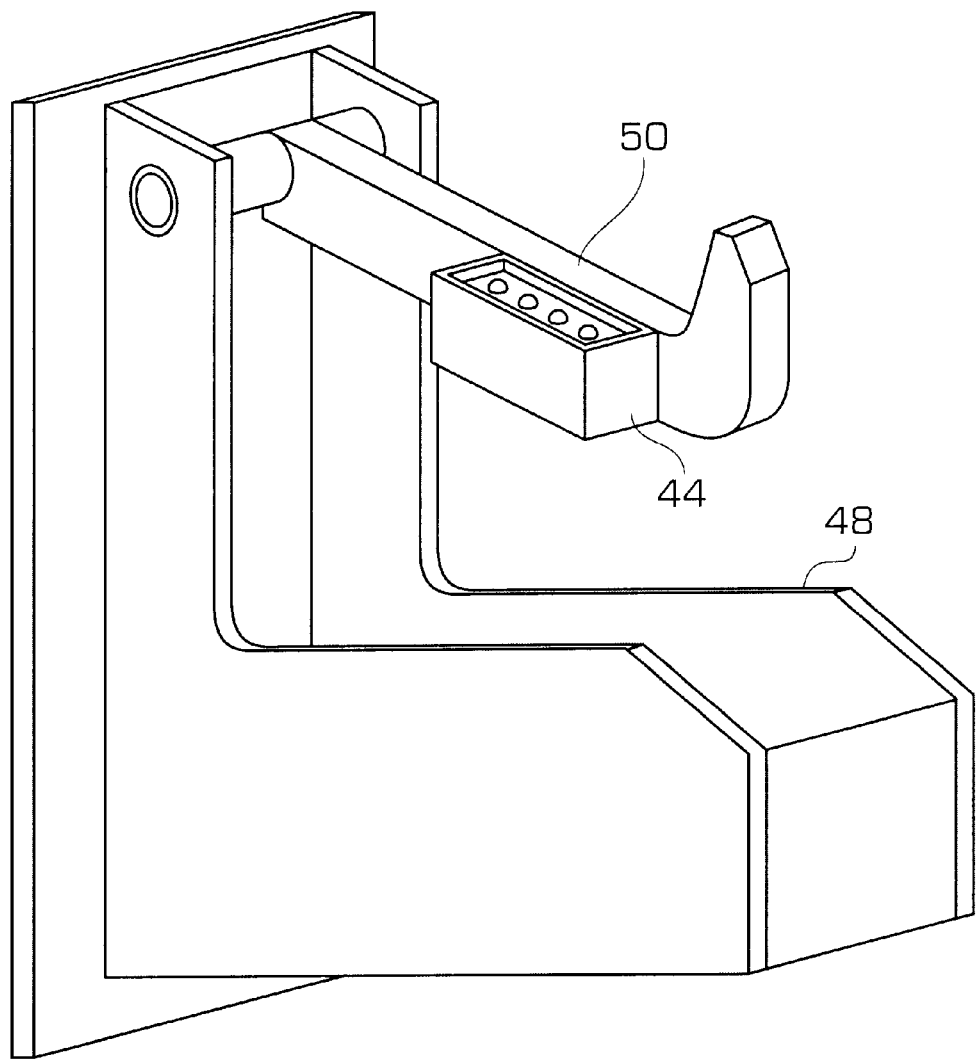
FIG. 11 is a perspective view of proximity switches mounted on a side of a vehicle restraint with a single rotating hook.
Figure 12:
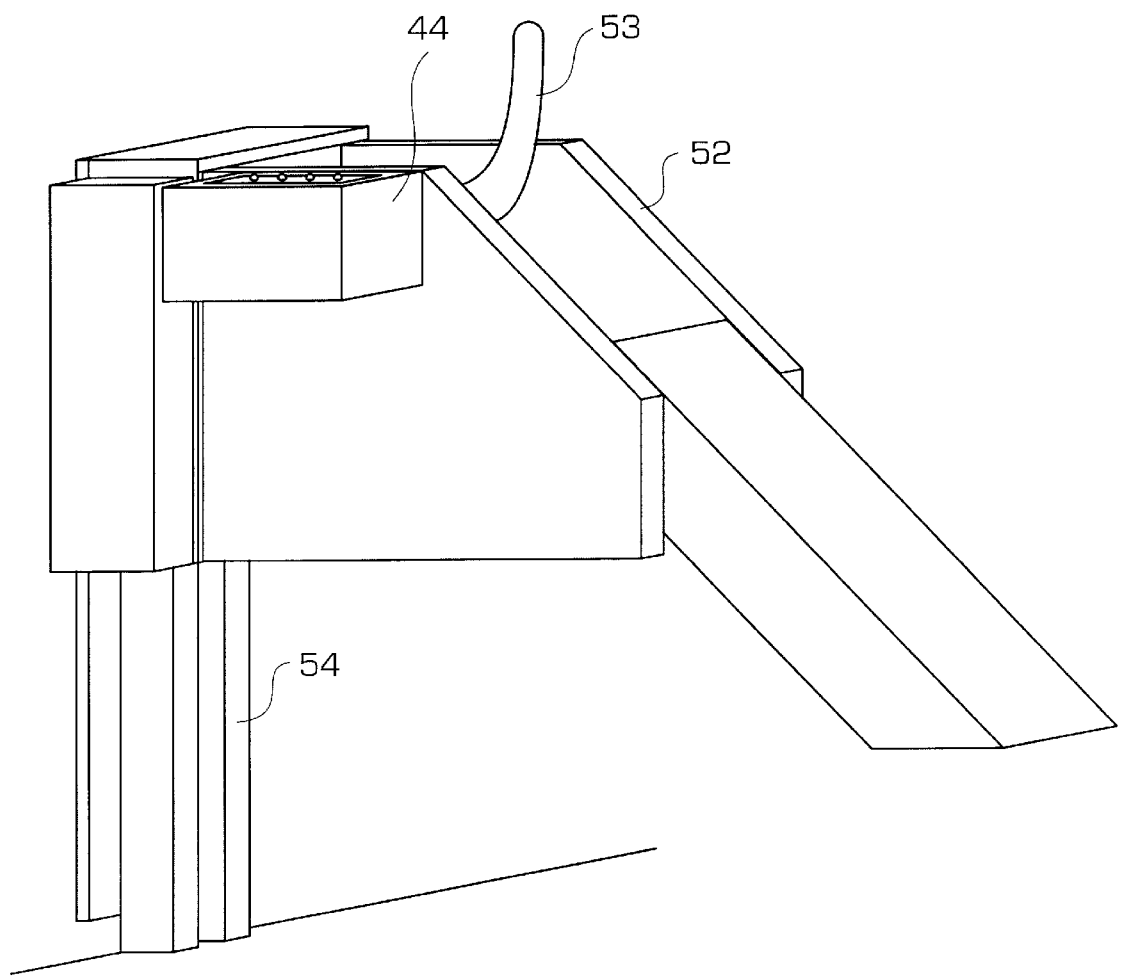
FIG. 12 is a perspective view of proximity switches mounted on the side of a vehicle restraint with a vertical traveling carriage.

Although the vehicle restraint hook shown in FIGS. 2, 4, 5 & 6 have the sensors mounted between the side plates of a vertically moving hook assembly, the invention is suitable for many different mounting configurations. For example, FIG. 11 shows the sensors 44 mounted to the side of a single rotating hook 50. The hook 50 is mounted to a frame 48 FIG. 12 shows the sensors 44 mounted to the carriage 52 of a vehicle restraint which tracks vertically on a frame or track 54 mounted to the dock wall. A hook 53 is mounted for rotation on the carriage 52 and engages an ICC bar which is positioned on the horizontal top surface of the carriage. Physical protection can be achieved in many different mounting configurations by a suitable housing.

FIG. 13 illustrates the use of an inductive loop 60 mounted in the cavity of a hook 30. As in the case of the proximity sensors, the inductive loop 60 would be protected by a non-conductive cover to prevent physical damage. The inductive loop, like the proximity sensor senses a change in frequency of an oscillator caused by conductive material, i.e. the ICC bar, entering the magnetic field of the sensor. In the case of the proximity switch the electronic circuit is usually a part of the sensor itself. In the case of the inductive loop, it is generally a separate circuit element physically separate from the loop.

FIGS. 14 illustrates the use of this invention in conjunction with a dual hook restraining device. Such vehicle restraints are known per se in the Serco VR series. In this device the secondary hook 60 is pivotally mounted to minimize the runoff of the hook relative to the portion of the vehicle engaging the hook. Thus, by reference to FIG. 2, an ICC bar 11 would not impact the secondary hook 60 and the presence of that hook prevents the vehicle from moving outward the horizontal distance to the vertical face 33. However, if the ICC bar is positioned at location 11A in FIG. 2, the secondary hook 60 will rotate downward so that the face 33 restrains outward movement of the vehicle.

In this third preferred embodiment the plate 35 holding the sensors 40 is displaced to one side of the secondary hook to sense the presence of the bar throughout the horizontal range of engagement. This includes the portion of engagement for the secondary hook 60. The sensor array does not have to span the entire surface of the hook because it has sufficient sensitivity with in the magnetic field to determine the presence of the ICC bar. While the sensors 40 are illustrates as all the same size, those elements positioned in front of the secondary hook may be configured differently to provide more sensitivity.

It is apparent that modifications of this invention may be practiced without departing from the scope of this invention.

I claim:

1. A vehicle restraint comprising: a fixed member, a hook movable relative to said fixed member for engaging a portion of a vehicle and restraining movement of said vehicle, and a sensor fixed relative to said hook to determine engagement of said hook with a portion of said vehicle, said sensor positioned to be not in contact with said vehicle.

2. A vehicle restraint of claim 1 wherein said sensor comprises at least one proximity switch embedded in said hook.

3. A vehicle restraint of claim 2 further comprising a non-conductive cover plate covering said sensor.

4. A vehicle restraint of claim 2 further comprising at least a second proximity sensor embedded in said hook.

5. A vehicle restraint of claim 4 further comprising a non-conductive insert for housing a plurality of sensors in said hook.

6. A vehicle restraint of claim 1, further comprising a carriage and wherein said sensor is mounted on said carriage for vertical movement with said hook.

7. A vehicle restraint of claim 1 wherein said sensor comprises a proximity switch mounted to have a magnetic field in a zone of contact of said portion of the vehicle that contacts said restraint.

8. A vehicle restraint of claim 1 wherein said sensor comprises an inductive loop mounted to have a magnetic field in a zone of contact of said portion of the vehicle that contacts said restraint.

9. A vehicle restraint of claim 1 wherein said hook is mounted for rotation on said frame and sensor is attached to said hook.

10. A vehicle restraint of claim 1 wherein said sensor comprises an array of magnetic sensitive elements embedded in a non-conductive body, said non-conductive body mounted to said hook.

11. A vehicle restraint comprising: a hook for engaging a portion of a vehicle made of a conductive material and restraining movement of said vehicle, and an inductive sensor positioned relative to said hook to provide an effective magnetic field allowing a determination of engagement of said hook with the portion of the vehicle made of conductive material.

12. A vehicle restraint of claim 11 wherein said inductive sensor comprises at least one proximity switch embedded in said hook.

13. A vehicle restraint of claim 12 further comprising a non-conductive cover plate covering said inductive sensor.

14. A vehicle restraint of claim 12 further comprising at least a second proximity sensor embedded in said hook.

15. A vehicle restraint of claim 14 further comprising a non-conductive insert for housing a plurality of inductive sensors in said hook.

16. A vehicle restraint of claim 11, further comprising a carriage and wherein said inductive sensor is mounted on said carriage for vertical movement with said hook.

17. A vehicle restraint of claim 11 wherein said inductive sensor comprises a proximity switch mounted to have a magnetic field in a zone of contact of said portion of the vehicle that contacts said restraint.

18. A vehicle restraint of claim 1 wherein said inductive sensor comprises an inductive loop mounted to have a magnetic field in a zone of contact of said portion of the vehicle that contacts said restraint.

19. A vehicle restraint of claim 11 wherein said hook is mounted for rotation on said frame and inductive sensor is attached to said hook.

20. A vehicle restraint of claim 11 wherein said inductive sensor comprises an array of magnetic sensitive elements embedded in a non-conductive body, said non-conductive body mounted to said hook.

* * * * *